United States Patent [19]

Potosky et al.

[11] Patent Number: 5,645,889
[45] Date of Patent: Jul. 8, 1997

[54] DECORATIVE SURFACE COVERINGS AND METHODS FOR MAKING

[75] Inventors: Milton J. Potosky, Hamilton Square; Robert J. Scheer, Belle Mead, both of N.J.

[73] Assignee: Congoleum Corporation, Lawrenceville, N.J.

[21] Appl. No.: 472,308

[22] Filed: Jun. 7, 1995

[51] Int. Cl.⁶ .................... B05D 5/06; B05D 1/36
[52] U.S. Cl. .................. 427/256; 427/258; 427/265; 427/348
[58] Field of Search ............... 427/256, 258, 427/263, 265, 273, 348, 359, 407.1

[56] References Cited

U.S. PATENT DOCUMENTS

| | | | |
|---|---|---|---|
| 1,498,200 | 6/1924 | Reed | 427/348 |
| 3,325,574 | 6/1967 | Stadden | 264/73 |
| 4,068,030 | 1/1978 | Witman | 428/159 |
| 4,126,727 | 11/1978 | Kaminski | 428/172 |
| 4,198,456 | 4/1980 | Adams et al. | 428/159 |
| 4,673,593 | 6/1987 | Shoji et al. | 427/262 |
| 4,756,951 | 7/1988 | Wang et al. | 428/204 |
| 4,863,782 | 9/1989 | Wang et al. | 428/204 |
| 5,178,912 | 1/1993 | Piacente et al. | 427/278 |
| 5,336,693 | 8/1994 | Frisch | 521/72 |
| 5,338,504 | 8/1994 | Wang et al. | 264/555 |

Primary Examiner—Shrive Beck
Assistant Examiner—Fred J. Parker
Attorney, Agent, or Firm—Synnestvedt & Lechner

[57] ABSTRACT

Decorative surface coverings comprising a multicolored, fused plastisol layer comprising (a) a fused plastisol composition of a first color; and (b) a fused plastisol composition of a second color, the second colored plastisol being distributed within the first colored plastisol such that the multicolored plastisol layer exhibits color gradients between the first and second colored plastisols. According to certain aspects the invention, the decorative surface covering products comprise a patterned solid plastisol mixture having a three dimensional appearance. Methods for manufacturing such decorative surface coverings comprise the steps of (a) applying to a substrate a coating of a first colored fluid plastisol; (b) distributing in the first colored fluid plastisol a second colored fluid plastisol to form a patterned fluid plastisol mixture; and (c) forming the patterned fluid plastisol mixture into a patterned solid plastisol mixture.

17 Claims, 2 Drawing Sheets

DECORATIVE SURFACE COVERINGS AND METHODS FOR MAKING

FIELD OF THE INVENTION

The present invention is directed to decorative surface covering articles and to methods of manufacturing such articles. More particularly, the present invention relates to decorative articles, such as floor and wall coverings, having unique and difficult to obtain design effects, and to flexible and versatile methods of forming such articles.

BACKGROUND OF THE INVENTION

Numerous types of floor and wall covering materials have heretofore been developed. In general, all such products seek to achieve two important but not necessarily consistent goals: aesthetic appearance and wear resistance. Of particular importance in many of these products is the achievement of a floor covering product in which the aesthetic appearance itself is resistant to wear. Such a feature helps to ensure that the basic "look" of the product does not change as the product is used.

With respect to aesthetics, it has particularly been a goal of the prior art to create decorative flooring products having a three dimensional appearance or the appearance of visual depth. Flooring products with these effects are frequently referred to as "inlaid," and such prior art inlaids have heretofore been associated with one of two basic classes of products.

The first class of inlaid product is formed by depositing a granular resin composition through openings in stencil plates onto a backing layer, the openings in the stencil plates defining the outline of the individual inlays. An example of this method is disclosed in U.S. Pat. No. 3,325,574. The backing layer is fed from a roll over an inlaying table. After each stenciling operation, the backing is fed or moved at a distance equal to the effective width of the stencils and additional granulated compositions of other colors or shades are applied at such intervals until the entire composite inlaid pattern is formed on the backing. Thereafter, the inlays are consolidated under heat and pressure to form a smooth surfaced sheet. The product is sometimes embossed in a subsequent operation, after which the final product is cooled and formed into a roll. Because this first class of product is made using multiple steps, it is unfavorably tedious and cumbersome. Additionally, the equipment used in this process is complex and costly.

Figure 1:
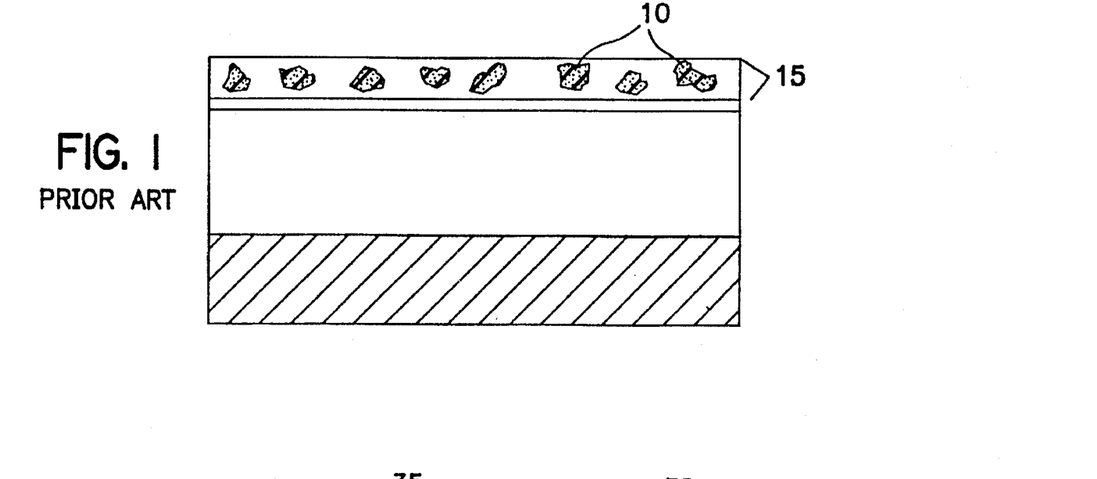
FIG. 1 is a semi-schematic, cross-sectional view of a decorative surface covering of the prior art, showing the substrate and the multicolored decorative surface comprising discrete colored particles of resinous material.

In the second basic class of products, as is shown in FIG. 1, decorative effects are produced by incorporating decorative particles, chips or flakes 10 into one or more layers 15 of the surface covering. These decorative particles are present substantially uniformly in the wear or other layer and are individually visible or discernable by persons viewing the flooring product.

The decorative particles in this second class of inlaid products are typically incorporated into the surface covering by one of two methods. In the first method, the decorative particles are distributed in a substantially uniform fashion over the entirety of a fluid plastisol layer. By way of example, U.S. Pat. No. 4,212,619 discloses the deposition of a layer of decorative particles onto a moving and vibrating web coated with a tacky, ungelled vinyl plastisol. This is followed by compressing the particles and the ungelled plastisol into a single layer by the use of pressure and thereafter gelling the plastisol at an elevated temperature. The gelled plastisol having the particles embedded therein is then fused to permanently fix the particles. Such a method is also considered cumbersome, as well as inefficient, generally involving application of the particles by sprinkling them onto a resinous surface to which they adhere and/or in which they can be embedded. Not only do agglomerates of the particles tend to form and clog the equipment, but the sprinkling of the particles leads to uneven distribution in the receiving surface because the particles tend to stick together.

In the second method, the decorative particles are instead dispersed, suspended or otherwise incorporated in the plastisol prior to application of the plastisol onto a backing sheet. As disclosed in U.S. Pat. No. 4,126,727, the decorative particles may be thoroughly blended into a polymer wear layer composition, which is then formed into a preformed, self-supporting sheet material by a calendering process. The preformed sheet is then laminated to a first resinous polymer layer. Alternatively, the decorative particles may be dispersed throughout a fluid material used to form the inlaid layer of the sheeting. For example, as disclosed in U.S. Pat. No. 5,178,912, a fluid vinyl plastisol is utilized as a carrier medium for the decorative particles. The plastisol and particles incorporated therein are then applied by a reverse roll coater to the receiving surface of the sheeting.

U.S. Pat. No. 5,338,504 similarly discloses a fluid material having decorative particles dispersed therein. A transparent or translucent layer containing plate-like particles is cast, after which a plurality of jet streams is directed onto the layer in order to reorient the particles at various angles with respect to the surface. Because the plate-like particles are substantially reflective to light, light is reflected at various angles as it passes within the layer, which is said to create an enhanced three dimensional effect.

The second basic technique for creating an "inlaid" product involves fewer steps and is, as a result, less time consuming and less costly, than the first basic technique. However, even this improved technique is inevitably limited with respect to the potential for design variations. The decorative particles may be sprinkled or mixed, compressed or reoriented, colored or pearlescent, reflective or nonreflective, discernable or not discernable. However, the particles will always remain distinct and any resulting design will necessarily be dependent at least to some extent on the geometry of the particles. The decorative possibilities of such inlaid products are thus unavoidably limited by the orientation, appearance and geometry of the individual particles. As a result, this technique provides no possibility to form continuous and varied gradations of color and shape as part of the wear layer. Furthermore, this technique provides no options to blending or harmonizing varied or dissimilar colors.

It is therefore an object of this invention to provide a method of manufacturing a decorative surface covering wherein the design or decorative effect lies within the wear surface itself, thereby eliminating the need for, but retaining the option of, a separate printed design layer.

It is an additional object of this invention to provide a method of manufacturing an inlaid-type decorative surface covering which does not require the positioning of discrete particles within a plastisol composition to obtain design effects.

It is a further object of this invention to provide a decorative surface covering which is capable of producing a three dimensional appearance and which is likened to natural formations such as marble or granite.

It is an even further object of this invention to provide a method of manufacturing decorative surface coverings which comprises relatively few steps.

SUMMARY OF THE INVENTION

Applicants have found the above and other objects of the present invention are satisfied by decorative surface coverings comprising: a multicolored, fused plastisol layer comprising (a) a fused plastisol composition of a first color; and (b) a fused plastisol composition of a second color, said second colored plastisol being distributed, and preferably randomly distributed, within said first colored plastisol such that said multicolored plastisol layer exhibits color gradients between said first and second colored plastisols. According to one aspect of the present invention, the decorative surface covering products comprise a patterned solid plastisol mixture, said mixture being a non-homogeneous mixture of the first and second plastisols, wherein the first plastisol differs in color from the second plastisol. According to another aspect of the present invention, the patterned plastisol mixture extends into the thickness of the multicolored layer and is, therefore, capable of imparting a three dimensional appearance or an appearance of visual depth to the product.

Methods for manufacturing such decorative surface coverings are also included in the present invention, and preferably comprise the steps of: (a) applying to a substrate a coating of a fluid plastisol composition comprising a first color; (b) distributing in said first colored fluid plastisol a fluid plastisol composition comprising a second color to form a layer comprising a patterned fluid plastisol mixture; and (c) forming said patterned fluid plastisol mixture into a patterned solid plastisol mixture. According to one embodiment of the present methods, a substrate is substantially uniformly coated with a first fluid plastisol composition comprising a first color. A plurality of droplets comprising a second colored fluid plastisol is substantially randomly applied onto the first plastisol coating to form a multicolored surface, after which said droplets are substantially randomly distributed on and within said first plastisol coating by directing a plurality of randomly moving fluid streams onto said multicolored layer. The number and movement of said fluid streams are preferably effective to distribute the droplets to form a layer comprising a patterned fluid plastisol mixture having gradients of fluid color therein. The multicolored layer is then fused in order to form the patterned fluid plastisol mixture into a patterned solid plastisol mixture. It is believed that the use of colored fluid plastisols, and particularly the use of relatively viscous colored fluid plastisols, coupled with the methods by which the fluid plastisols are distributed, contributes significantly to the unique aesthetic qualities and distinctive design effects of the present invention.

The products and methods of the present invention also posses other advantageous features, as will become apparent from the detailed description hereinbelow.

DETAILED DESCRIPTION OF PREFERRED EMBODIMENTS

I. THE PRODUCTS

The surface covering products of the present invention include as the essential element a decorative layer comprising a patterned, solid plastisol mixture. As used herein, the term "patterned, solid plastisol mixture" refers to any non-homogeneous mixture, including randomly dispersed mixtures, of at least a first plastisol and a second plastisol, wherein the first plastisol differs from the second plastisol in at least the color thereof. It is thus contemplated that the first and second plastisols of the mixture may be substantially identical except for coloration. The term "mixture" is used herein to describe a three-dimensional mixture, that is, a mixture which extends into the thickness of the layer, as opposed to a simple surface coating.

In its broadest aspect, the surface covering products of the present invention comprise such a decorative layer as a component thereof, and preferably as a component of the wear layer. While such a layer may be self-supporting and, therefore, may itself constitute a surface covering product according to certain embodiments, the present surface covering products may include one or more additional elements to enhance the properties thereof. With particular reference to a preferred embodiment shown in FIG. 2, for example, decorative layer 25 of the present invention is supported by a composite base layer or substrate 20 including backing material 20A and intermediate resinous layer 20B. Further, overlying decorative layer 25 is top coat 40. These elements are described in more detail below.

A. Decorative Layer

While it is contemplated that the present surface coverings may include other decorative elements, such as a printed layer, the decorative portions necessarily include a decorative layer as herein described.

The decorative layer of this invention comprises a patterned, solid plastisol mixture comprising at least a first plastisol and a second plastisol. As is known to those skilled in the art, plastisol compositions may exist in a fluid or a solid state. The surface covering articles of the present invention relate to solid state plastisols, particularly and preferably fused plastisols.

In the fluid state, the plastisol comprises thermoplastic resin particles dispersed or suspended in a liquid plasticizer. As is known to those skilled in the art, the application of heat to fluid plastisols generally causes physical changes in the rheology of the plastisol. In particular, fluid plastisol compositions are known to pass through or enter a gel phase as the temperature of the plastisol is raised to a sufficiently high level. Without intending to be bound by or limited to any particular theory, it is believed that upon the application of heat to fluid plastisol compositions of the present invention, the plasticizer portion thereof begins solvating the polymeric material. This initiation of solvation is sometimes referred to as pre-gelation and is associated with the resin particles becoming swollen with plasticizer. As additional heat is applied to the plastisol, continued solvation of the polymer results in a loss of plastisol fluidity. This loss of fluidity is associated with the "gel phase" or "gel state" of the plastisol. It will be appreciated by those skilled in the art that as the temperature is raised from about room temperature to about the gel point, plastisols will generally first exhibit a decrease in viscosity, followed by a gradual increase in viscosity until the gel point is reached.

The gelation temperature range of any particular plastisol is a function of many variables, including the type and relative amounts of plasticizer and resin present. It is generally contemplated, however, that the gelation temperature range of the fluid plastisols of the present invention will take place at temperatures of from about 110° F. to about 340° F., and preferably from about 280° F. to about 340° F. After complete gelation, the plastisol is generally a substantially dry solid with little or no cohesive strength. As is well known to those skilled in the art, the gel comprising the plasticizer and the organic polymeric material will fuse upon the application of sufficient heat thereto. In particular, it is known that the heating of a plastisol sufficiently past its gel point causes the plasticizer molecules to begin to become incorporated into the matrix of the molecules of the resin, and "fusion" begins. As heating continues, the plasticizer becomes substantially integrated into the polymer network of the resin. In such a state, the plastisol is said to be a fused or solid plastisol. The fusion temperature range, or the temperature range over which fusion takes place, is typically a range of temperatures beginning above about the gel point.

It is to be appreciated that, although plastisols will be used to further describe the present invention, such is not intended to exclude the use of the organosols, aqueous lattices and the like which are also utilizable, and the use of the term "plastisols" is intended herein to include same.

In contrast to the decorative layers utilized in the products of the prior art, the decorative layers of the present invention include decorative patterns formed by a nonhomogeneous mixture of at least two solid plastisols. Importantly, however, the plastisol patterns of the present invention have shapes that are independent of the shape of any macroscopic particle. More specifically, each plastisol of the present invention carries a coloring agent that imparts color, tint and/or tone to the plastisol. The coloring agents of the present invention are not carried by a macroscopic, visually observable particle, as was common in the prior art. Rather, the plastisol itself is colored by microscopic coloring agents, such as pigments, dyes and the like, which have no observable shape of their own. In this way, applicants are able to achieve color patterns that are not limited by the shape of a decorative particle since the coloring agents are capable of substantially permeating the plastisol without imparting any visually observable shape or presence apart from the plastisol as a whole. Because of these characteristics, the flexibility and options available to the designer are almost infinite.

Figure 2:
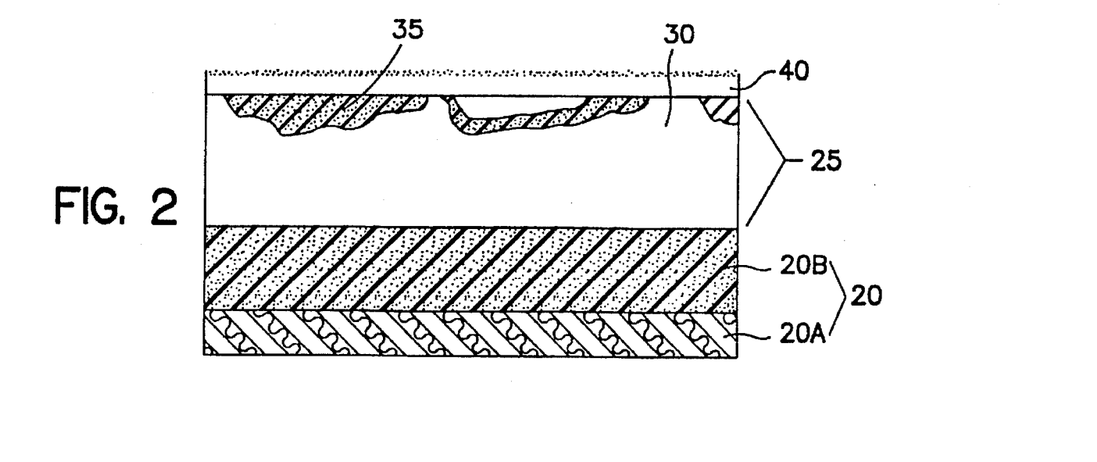
FIG. 2 is a semi-schematic, cross-sectional view of a decorative surface covering in accordance with one embodiment of the present invention.

With particular reference now to FIG. 2, the preferred decorative surface coverings of this invention comprise a multicolored decorative layer 25 which comprises a patterned, solid plastisol mixture, said mixture comprising a plastisol of a first color 30 and a plastisol of a second color 35, the second colored plastisol 35 being distributed, and preferably randomly distributed, within the first colored plastisol 30 such that the multicolored decorative layer 25 exhibits color gradients therein. As used herein, the term "colored plastisol" is intended to encompass plastisols colored by microscopic coloring agents as discussed above, and which exhibit the appearance of a substantially continuous color, tone or variation in color or tone. Furthermore, the terms "first color" and "second color" are used herein in a relative sense so as to identify plastisols which exhibit coloration that is visually different. Thus, the terms "first color" and "second color" are used to encompass combinations of plastisols in which one of the plastisols appears as clear, transparent or translucent, provided the color of the second plastisol is not similarly clear, transparent, or translucent. In preferred embodiments, because of the particular arrangement of the colored plastisols, the plastisol layers will generally include color gradients between the particular colors of the plastisols. In some instances, these color gradients will be distinct or sharp, and in other instances these gradients will be gradual gradations from one color to another.

Applicants have found that these color gradients are capable of imparting to the preferred multicolored layer a three dimensional appearance or the appearance of visual depth. The color gradients are, in essence, patterns within the plastisol that are distinctively independent of the shape of any macroscopic particle.

Figure 5:
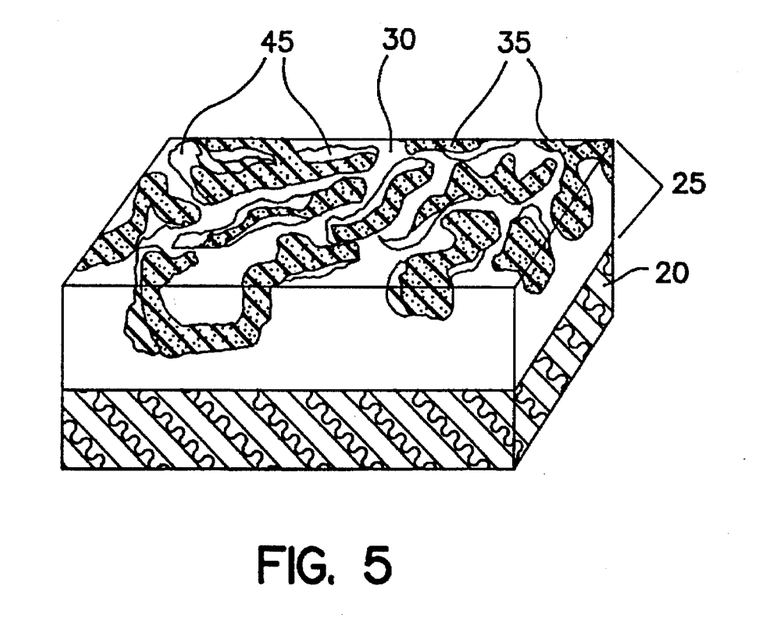
FIG. 5 is an illustration of the decorative surface covering of FIG. 4 after the redistribution step, showing the color gradients resulting from distributing the second colored fluid plastisol in the first colored plastisol.

Importantly, the color gradients within the preferred patterned solid plastisol mixture of the present invention exist not only on the surface of the multicolored layer, but also extend below the surface. As shown in FIG. 5, the gradients of color and the various shapes taken on by the color gradients actually penetrate into the thickness of the layer. It is because of this distinctive feature of the present invention that the resulting product is capable of exhibiting a favorable three dimensional appearance or an appearance of visual depth. Applicants have further found that, because the particular design effects of this invention are created within the plastisol layer, and thus within the wear layer itself, the unique decorative appearance of the resulting product substantially does not change as the product wears. The patterned, solid plastisol mixture is not merely a surface coating, but instead extends into the decorative layer of this invention, thereby creating a through wear layer.

The details of the components used or usable in the present colored plastisols will now be described.

1. Resins

While a number of resins are contemplated for use in the plastisols of this invention, it is preferred that the resins comprise polymeric particles which are readily combined with the plasticizer to form a smooth, stable fluid paste. The fluidity and other characteristics of the present plastisol compositions are determined, in part, by the size of the resin particles included in the composition. Thus, while it is believed that suspension resins having particle sizes of from about 75 to about 350 microns may be included in certain embodiments of the present invention, it is preferred that the resin comprise dispersion grade resins having a particle size of from about 0.02 to about 25 microns, with dispersion grade vinyl resins being even more preferred.

Processing techniques are well known and available for mixing such dispersion grade resin particles into plasticizer with sufficient shearing action to ensure dispersion of the resin particles in the plasticizer. The particles may be optionally coated with an emulsifier to assist in dispersion in the plasticizer.

The resins of the present invention preferably comprise vinyl polymers and even more preferably vinyl chloride polymers. The vinyl chloride polymers can be simple, unmixed homopolymers of vinyl chloride or block copolymers, terpolymers or the like thereof in which the essential polymeric structure of poly(vinyl chloride) is interspersed at intervals with residues of the other ethylenically unsaturated compounds polymerized therewith. Furthermore, it is contemplated that mixtures and combinations of the above may be employed. It is contemplated that comonomers may include, for example: vinyl halides such as vinyl bromide and vinyl fluoride; vinyl esters such as vinyl acetate, vinyl chloroacetate, vinyl butyrate, other fatty acid vinyl esters, vinyl alkyl sulfonates and the like; vinyl ethers, such as vinyl ethylether, vinyl isopropyl ether, vinyl chloroethyl ether and the like; cyclic unsaturated compounds such as styrene, the mono- and poly-chloro styrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethylmaleate, diethyl fumarate and the like; vinylidene compounds, such as vinylidene chloride, vinylidene bromide, vinylidene fluorochloride and the like; unsaturated hydrocarbons such as ethylene, propylene, isobutene and the like; allyl compounds, such as allyl acetate, allyl chloride, allyl ethylether and the like; and conjugated and cross-conjugated ethlynically unsaturated compounds such as butadiene, isoprene, chloroprene, 2,3, dimethylbutadiene-1,3-piperylene, divinyl ketone and the like.

Although such vinyl chloride resins are preferred, it is contemplated that the present compositions may be formed using other polymeric material, and in its broadest sense the invention is not intended to be limited to any particular polymer or polymer groups since many other types and groups of polymers may be selected in view of the guidance of the present disclosure without undue experimentation.

2. Plasticizers

The plasticizers generally function so as to increase the workability, flexibility and/or distensibility of the polymeric material of the present invention.

The liquid plasticizer of the plastisol or organosol forms of the present compositions is selected on the basis of its compatibility with the resin constituent of the composition, that is, its ability to produce a gel, and ultimately a fully fused solid, when the composition is heated. As is well known to those skilled in the art, plasticizers are generally high boiling, chemically and thermally stable organic liquids, low-melting solids or semisolids. The plasticizers affect several properties of the surface coverings of the present invention. For example, the plasticizer can have an effect on the rheology of the present fluid plastisols compositions as well as on the strength and flexibility of the present fused plastisols. With the guidance provided herein, it is expected that one skilled in the art will be capable of selecting the plasticizer needed for any particular application without undue experimentation. In general, however, it is highly preferred that the plasticizer be readily mixable with the resin particle to form a homogenous composition which resists exudation of the plasticizer. Furthermore, an important aspect of the present invention resides in the ability of the plasticizer to fluidize, solvate, gel and eventually fuse with the resin polymer selected. In this regard, it is believed that the plasticizers of the present invention achieve the desired result through external plasticization. That is, the plasticizers interact physically with the resin polymer to reduce the mutual attractive forces between polymer chains. Accordingly, while the plastisols of the present invention may include a certain amount of internal plasticization, such as, for example, copolymerization or graph polymerization of the vinyl chloride-vinyl acetate, this is not believed to be necessary for operation of the present invention. Accordingly, the plasticizers of the present invention serve to aid in the processing characteristics of the fluid plastisols to impart flexibility, elongation and toughness to the fused plastisol compositions. Another desirable property of the plasticizers is thermal and oxidative stability since such materials are generally exposed to high temperatures, such as 350° F. and higher, during processing and use. For this reason anti-oxidants, such as biphenyl A, may optionally be employed in the present compositions.

It is contemplated that the amount of plasticizer used in the compositions of the present invention can vary widely, depending upon such factors as the desired properties and uses of the composition, the characteristics of the first polymer, and the like. It is generally preferred, however, that the present compositions contain from about 40 to about 75 parts by weight of plasticizer per 100 parts by weight of resin, with about 45 to about 60 parts per hundred being even more preferred. For embodiments in which the resin comprises vinyl chloride resin, the use of about 48 to about 58 parts by weight of resin is preferred.

The plasticizers of the present invention preferably comprise ester compounds such as monomeric phthalate esters, dibasic acid esters, trimellitates, phosphate esters and polyesters, with monomeric phthalate esters being the most preferred. Monomeric phthalate esters employed according to the present invention are preferably selected from the group comprising dibutyl phthalate (DBP), dibutoxy ethyl phthalate (DBEP), butyl benzyl phthalate (BBP), butyl octyl phthalate (BOP), dihexyl phthalate (DHP), dioctyl phthalate (DOP), diisooctyl phthalate (DIOP), dicapryl phthalate (DCP), dicapryldioctyl phthalate (DCOP), diisononyl phthalate (DINP), diisodecyl phthalate (DIDP), ditridecyl phthalate and mixtures of these. Dibasic acid esters used as plasticizers according to the present invention are preferably selected from the group comprised of adipate esters, azelate esters and sebecate esters, and mixtures of these. Adipate esters are preferably selected from the group comprising dioctyl adipates (DOA), diisononyl adipate (DINA), diisodecyl adipate (DIDA) and mixtures of these. The azelate esters are preferably selected from the group comprising dioctyl azelate (DOZ), diisooctyl azelate (DIOZ), di-n-hexyl azelate and mixtures of these. When sebecate esters are used, dibutyl sebecate, dioctyl sebecate, dibenzyl sebecate, butyl benzyl sebecate and mixtures of these are preferred. Phosphate esters used as plasticizers according to the present invention are preferably selected from the group comprising tricresyl phosphate, cresyl diphenyl phosphate, octyl diphenyl phosphate and mixtures of these.

It is also contemplated that glycol benzoates, glycol butyrates, citrates, isophthalates, and aliphatic and aromatic hydrocarbons and chlorinated hydrocarbons may also be used alone or in combination with those plasticizers described above.

Although the fluid compositions preferably comprise a plastisol in which the carrier is plasticizer, it should be understood that other materials can also be used as the carrier. For example, there can be used also an organosol, that is, a composition containing fine particles of resin suspended in a liquid plasticizer and including also a volatile liquid solvent. It is contemplated that latex and other materials may constitute the fluid compositions according to certain embodiments.

3. Coloring Agents

The coloring agents for imparting color to the plastisols of this invention may contain pigments, such as titanium dioxide, cobalt blue, azo condensation reds, iso yellows, carbon black, diazo yellows, thiocyanine blue and green, and importantly comprise microscopic, visually undetectable (to the naked eye) color or pigment particles. Other suitable coloring agents are well known in the flooring industry and generally comprise iron oxide, lead chromate, and organic dyes.

4. Other Additives

The plastisol compositions of the present invention may also contain other constituents as are known and available, including: various light and/or heat stabilizers; solvents and diluents, such as methyl ethyl ketone, mineral spirits, etc.; fillers such as clay and limestone; viscosity improvers; UV absorbers; anti-oxidants; bacteriostats and bactericides; surfactants and many other conventional and well known additives and improvement agents. The specific nature and particular physical and chemical properties of these additives do not, in general, relate to the essence of the present inventive concept and, further specific elaboration of such additives is believed not to be required.

It is also contemplated that during the manufacturing of the present products, agents for inhibiting the blowing or foam of underlying, foamable plastisol layers may be utilized in one or more of the colored plastisols in accordance with the present invention. The use of such additives is described fully hereinafter in connection with the method aspects of the present invention.

It is also preferred that small amounts of stabilizers, such as heat and light stabilizers, well-known in the art of making polyvinyl chloride compositions, be incorporated into the vinyl resin compositions of the present invention to minimize the effects of degeneration by light and heat. Primary stabilizers ordinarily used are metallo organic compounds, salts or complexes containing a metal component such as cadmium, zinc, lead, tin, barium or calcium combined with an alaninc constituent such as ottowate, 2 ethyl hexowate, napthenate, tallate, benzoate, oxide, acetate, stearate, phenate, fluorate, caprylate, phosphite, phthalate, maleate, fumarate, carbonate, sulfate, silicate, alkyl mercaptide or mercapto acid salts and esters.

Although an important aspect of the present invention is the achievement of decorative effects utilizing plastisol mixtures, it is contemplated that other conventional decorative techniques may be used in combination with the present decorative effects. For example, it is contemplated that in certain embodiments decorative particles may also be included in the plastisol so as to produce a further decorative effect. It is also contemplated that decorative designs may be printed in conventional fashion either below or above the plastisol layer of the present invention. All such variations are within the scope of the present invention.

B. Substrates

The figures illustrate a composite base layer or substrate 20 comprising a relatively flat backing sheet material 20A, and an optional intermediate layer of resinous material 20B overlying the backing material, as described in more detail hereinbelow.

1. The Backing Sheet

The base layer or substrate may comprise a relatively flat, fibrous backing sheet material 20A and/or other relatively flat sheet material. Such a backing sheet material 20A may comprise a felted or matted fibrous sheet of overlapping, intermingled fibers and/or filaments. Further, the backing sheet 20A may comprise a non-woven, knitted, woven or otherwise textile fabricated construction; or a sheet of resinous polymer composition; or paper or paper product or similar or like equivalent constructions and materials. Furthermore, the present substrate may be considered to comprise a laminate or composite of one or more of the above-noted materials. A felted fibrous sheet material comprising organic fibers, such as cellulose, cotton, jute, or rayon; or synthetic or man-made fibers and/or filaments, such as polyolefins, polyamides, acrylics, etc. is the most commonly employed backing material but many others are equally suitable and utilizable in certain embodiments. Such backing sheets are well known and available to those skilled in the art and are described, for example, in U.S. Pat. Nos. 3,293,094; 3,293,108; 3,660,186; and 4,274,916, each of which is assigned to the assignee of the present invention and incorporated herein by reference.

The thickness of such relatively flat backing sheet material 20A depends upon numerous and varied factors, including the particular surface covering product which is to be made and the particular subsequent use for which it is intended. Normally, such thicknesses are in the range of from about 10 mils to about 90 mils, but other thicknesses, especially those greater than 90 mils, may be used according to certain embodiments of the present invention.

2. The Resinous Base or Intermediate Layer

The relatively flat backing sheet material 20A may be used by itself as a base layer or a substrate, or it may be used in conjunction with other sheet materials, such as, for example, a layer 20B of potentially foamable or non-foamable resinous polymer composition. According to certain embodiments, the relatively flat backing sheet material 20A may be omitted completely and the foamable or non-foamable resinous polymer layer 20B may be used by itself as a substrate or backing material. Such resinous polymer compositions may be made by well known standard and conventional methods and may contain one or more synthetic resins, such as polymer or co-polymer or vinyl chloride, or other resins, such as polyurethanes, as the main constituent resin. Other constituents of such resinous polymer layer 20B may include one or more of the ingredients described above in connection with the plastisol layers of the present invention.

Although a polymer or co-polymer or vinyl chloride in the form of a plastisol is the preferred and typical synthetic resin to be incorporated into the resinous polymer composition used in the backing layer, many other resins are equally applicable, not only in plastisol form, but also in organosol, latex or solvent form.

For preferred compositions in which the resinous layer 20B is a foamed or foamable resinous layer, it is preferred that such layer include a blowing or foaming agent, when blowing or foaming is desired or required. Many acceptable blowing or foaming agents are contemplated for use within the scope of the present invention. Such specific foaming or blowing agent does not relate to the essence of the present invention and many other suitable and acceptable blowing or foaming agents are to be noted in the previously mentioned United States patents. All that is required is that the blowing or foaming agent has a sufficiently high decomposition temperature that it is not activated or decomposed prematurely during the procedures of heating, gelling, etc., as described hereinafter.

If no permanent backing sheet material, such as felted or matted fibrous web is to be used, then the foamable plastisol may be doctored by a doctor blade or roll coated, or poured, or cast, or otherwise applied to a strippable carrier which may be a steel belt, a rubber belt, release paper or a felt or other fabric having release coating thereon and subsequently stripped therefrom. However, if a backing sheet material is to be used and is to remain as part of the final product, then the plastisol may be doctored by a doctor blade, or roll coated, or cast, or otherwise applied and adhered to the carrying sheet material in a substantially uniform manner in a relatively uniform thin coating by procedures well known in the art. The thickness of such a foamable plastisol coating as applied and still wet, is in the range of from about 5 to about 50 mils, or even more if preferred or desired. After the foamable plastisol has been applied to the carrying backing sheet and blown or foamed as described more fully hereinafter, the layer 20B of resinous material will typically have a thickness of from about 20 to about 80 mils.

C. Topcoats

A topcoat 40 is preferably applied over and adhered to the decorative layer 25 of the present invention. Topcoat 40 is preferably in the form of a resinous polymer composition or plastisol. Such a topcoat 40 may contain conventional or standard constituents, such as resins, plasticizers, stabilizers, solvents, diluents, viscosity improvement in controlling agents, and like additives and materials. The topcoat 40 preferably comprises a layer having a thickness or depth of from about 0.0005 inch to about 0.025 inch.

II. THE METHODS

Although it is contemplated that the decorative surface coverings of this invention may be made by several techniques, applicants have found that highly desirable and beneficial properties, including enhanced visual and decorative effects, are obtained when the products are manufactured according to the methods as described herein. The methods of this invention preferably comprise the steps of: (a) applying to a substrate a coating of a fluid plastisol composition comprising a first color; (b) distributing in said first colored fluid plastisol a fluid plastisol comprising a second color, so as to form a layer comprising a patterned fluid plastisol mixture; and (c) forming said patterned fluid plastisol mixture into a patterned solid plastisol mixture.

While a substrate 20 is utilized in the methods of this invention as a base or means of support for forming the decorative layer, it is to be appreciated that such substrate may be a permanent element of the final product or may be an element which is removed after the formation of the patterned solid plastisol mixture.

For purposes of convenience, the methods of this invention will be discussed below with references to FIGS. 3 through 5.

A. Applying the First Plastisol

Figure 3:
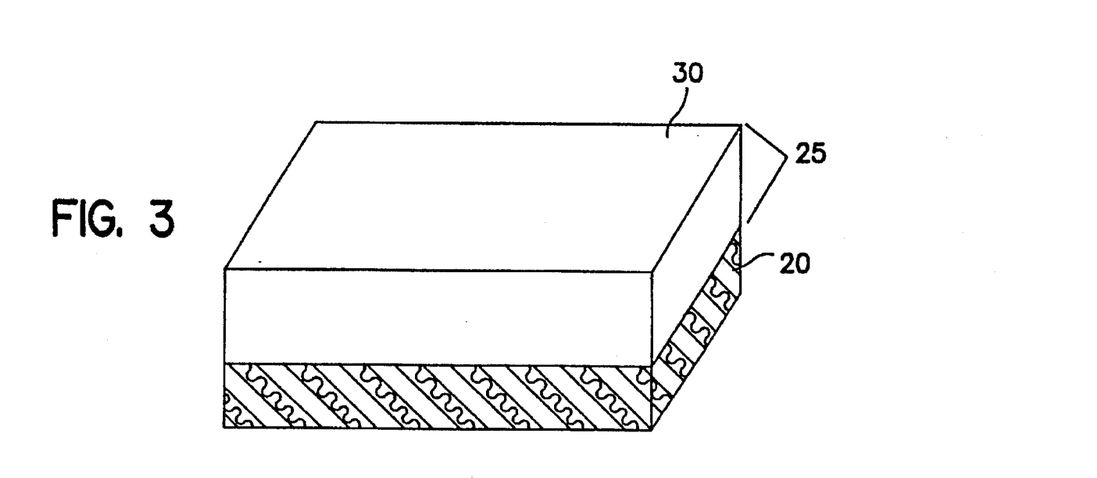
FIG. 3 is a semi-schematic perspective view of an intermediate of a decorative surface covering in accordance with one embodiment of the present invention, showing the application of the first colored plastisol, but prior to the application of the second colored plastisol.

With particular reference now to FIG. 3, a first colored fluid plastisol 30 is substantially uniformly applied as a coating to the surface of the substrate 20 to form a plastisol-coated substrate as can be seen in FIG. 3. Application of the first colored plastisol may comprise any one of myriad techniques commonly employed for coating a fluid composition onto a surface such as, for example, the reverse roll coating technique. Other means of application such as spray coating, curtain coating and the like can also be employed.

The thickness of the first colored plastisol coating, as it is applied to the surface of the substrate and is still wet, is substantially uniform and is in the range from about 0.010 to 0.040 inches, or even thicker, if so desired or required by future requirements or needs.

As stated earlier, the substrate upon which the first plastisol is applied comprises a backing sheet and may optionally include a foamed or foamable resinous layer. It is contemplated, when such a foamed or foamable layer is used, that one or more of the plastisols of this invention may comprise an additive which is able to react with the foaming or blowing agent present in the resinous layer, from which an embossed, foamed, polymeric product can be made. These additives are referred to as "foaming agent modifiers" or "chemical embossing agents" and, as the terms are used herein, include both accelerators and inhibitors which modify the activity, i.e. the "foaming" properties, of the foaming or blowing agent in the resinous layer. Typically, areas in which the resinous layer comes in contact with an accelerator appear relatively "raised," while areas which come in contact with an inhibitor appear relatively "depressed," with the resulting product being preferably capable of comprising multiple "levels," each level depending upon whether an inhibitor, an accelerator or no modifier comes in contact with the foamable plastisol layer.

A foaming agent accelerator can function in various ways to modify the activity of the foaming or blowing agent. For example, it can accelerate decomposition of the blowing agent, or it can reduce the temperature at which the blowing agent decomposes, or it can narrow the temperature range over which the blowing agent decomposes to reduce the temperature at which the blowing agent is activated. Examples of preferred foaming agent accelerators include zinc oxides, dyphos, and tin octoate. In contrast, an inhibitor, upon coming into contact with the blowing agent, has the effect of deactivating the blowing agent or raising the temperature at which the blowing agent "blows." Thus, when the gelled foamable plastisol is fused by heating, the selected portions of the surface covering that incorporate a plastisol comprising an inhibitor are foamed or expanded to a lesser extent or not expanded at all, with expansion being limited to those portions which are foamed as a result of activation of the blowing agent. Examples of preferred foaming agent inhibitors include fumetic acid, trimellitic anhydride, maleic acid, and tolytriazole.

B. Distributing the Second Plastisol

Figure 4:
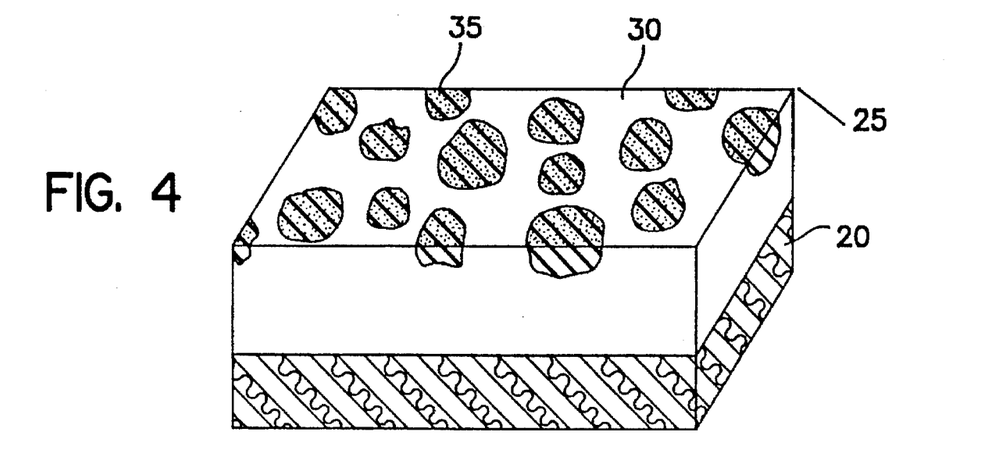
FIG. 4 is an illustration of the decorative surface covering of FIG. 3, after application of the second colored plastisol, but prior to the redistribution of the second colored plastisol in the first colored plastisol.

With reference to FIG. 4, after the first colored fluid plastisol 30 is applied to the substrate, a fluid plastisol 35 comprising a second color is distributed in the first colored plastisol to form a multicolored surface 25 comprising a patterned fluid plastisol mixture.

According to preferred embodiments, the distribution of the second colored fluid plastisol comprises applying the second colored fluid plastisol 35 substantially randomly as a plurality of fluid droplets on the surface of the first colored fluid plastisol 30 to form a multicolored surface 25 such as that illustrated in FIG. 4. According to preferred embodiments, the relative viscosity and rheology of the first and second colored plastisols is such that the droplets of the second colored plastisols relatively slowly penetrate, under the influence of gravity and/or under the influence of accelerated forces upon delivery, into the thickness of the layer of the first colored plastisol. In such embodiment, the droplets of the second colored fluid plastisol 35 extend from the surface of the first fluid plastisol layer 30 into the thickness of the layer 25. It is contemplated that the second colored plastisol 35 may be applied to the first colored plastisol by dripping, sprinkling, streaming, spraying, or by applying a substantially uniform coating of the second colored plastisol on top of the first colored plastisol. It is contemplated that the application of the second colored fluid plastisol in the form of geometric shapes would provide an even further option for a different look or effect in the final product.

It is believed that any other similar method which would allow for placement of the second colored fluid plastisol on the surface of the first fluid plastisol is adaptable for use in carrying out the methods of this invention. The choice of the method of application, as well as additional variations or variables of the plastisol characteristics, will depend upon the preferred resulting appearance of the final product. It is to be appreciated that, although droplets will be used to further describe the distribution of the second colored plastisol on the first, such is not intended to exclude the use of the above and other alternatives which are also utilizable, and the use of the term "droplets" is intended herein to include same.

The distribution of the second colored fluid plastisol preferably further comprises the step of integrating the second colored fluid plastisol into the first colored fluid plastisol. In this further aspect of the distributing step, the second colored fluid plastisol 35 is distributed in the first colored plastisol 30 to form a distinctive decorative layer 25 comprising a patterned fluid plastisol mixture having varying color gradients therein, as shown in FIG. 5. According to preferred embodiments, the droplets of the second colored plastisol 35 are distributed by directing a plurality of moving fluid streams onto the surface of the decorative multicolored layer 25, the number and movement of said fluid streams being effective to reorient and reshape the second colored plastisol droplets on and within the first colored plastisol while maintaining color gradients and areas of distinct color variation in the decorative layer. While pneumatic means, such as air, gas or fluid streams, are the preferred means for further distributing the fluid plastisols, it is understood that additional suitable mechanical means are available and within the scope of this invention, including but not limited to mechanical manipulation using screen mesh, pin rolls, sponge rolls, knap rolls and filament rolls, and/or planar analogues thereof in either random or pattern forms.

This additional distribution of the second colored plastisol droplets comprises the mixing of the second colored fluid plastisol with the first, including stretching and/or reshaping the droplets in multiple directions, all of which importantly result in an array of hues 45 within the decorative layer 25. Importantly, the mixing of the two colored plastisols 30, 35 includes the blending of the plastisols, but is carried out only to a partial state, wherein a complete blending of the colored plastisols is not attained. Instead, multiple variations of the colors or color gradients result, including discrete areas in which the two original colors remain intact. As used herein, the term "color gradient" is intended to include any and all variations of the plastisol colors, including each color as it originally appears prior to distribution.

The present invention is not limited with respect to the number of color gradients resulting from the such distribution step. The number and type of color gradients will depend at least in part on the duration and degree of mechanical distribution. For instance, the number of air streams, the directions of the air streams, and the force of the air streams will have a substantially direct result on the resulting pattern, as will the length of time for which the air streams are directed onto the multicolored surface.

Of significant importance to this invention is the use of relatively viscous colored fluid plastisols coupled with the above-stated methods by which said colored fluid plastisols are distributed in order to create new decorative surface coverings having unique and distinctive design effects. In particular, applicants have found that the use of such relatively viscous fluid plastisols is instrumental to obtaining the control over the application and distribution of the plastisols which is essential to the decorative effects of this invention.

Although it is contemplated that the viscosity of the colored plastisol as used in the present invention may vary widely depending upon the desired design effect and the needs of any particular application, it is generally preferred that the first colored and second colored plastisol fluids have a relatively high viscosity, preferably a viscosity of at least about 300 cps, and even more preferably, from about 800 to about 1700 cps. Applicants have found that, in general, higher plastisol viscosities are preferred because they afford greater control over the application and distribution of the first and second color plastisols to form a multicolored fluid plastisol layer. The lower the viscosity, the more that plastisol tends to "flow" and the more difficult it is to obtain control over that plastisol and the application or distribution thereof. It is preferred that the plastisols of this invention are of such a viscosity and rheology that the placement or distribution of the plastisols can be substantially controlled. For plastisols comprising PVC resin dispersed in plasticizer, it is preferred that the fluid plastisols have a viscosity of at least about 300 to about 5000 cps at ambient temperatures, and even more preferably about 800 to about 1700 cps.

The fluid plastisol viscosities of the present invention may be similar or may vary, depending upon the desired look or appearance which is to be created, and also upon the amount of control desired with respect to the flow and distribution of the plastisols. Moreover, the viscosity differences or similarities between the different colored plastisols will determine the extent of the blending or distribution of one plastisol within another. Namely, the plastisols tend to flow and, therefore, blend with the least effort when there is a common low viscosity and require more effort when there is a common high viscosity, with numerous variations lying therebetween. It is to be appreciated that these and other variables, while not limiting to the present invention, have a direct effect on the appearance of the resulting decorative surface product. It is further believed that particular decorative effect desired may be obtained via a number of field trials incorporating any combination of these variables.

In addition to the number of available combinations resulting from variations in the fluid plastisols and means for distributing the plastisols, it is contemplated that even further combinations may result from varying the number of fluid plastisols as well as the number of distribution steps utilized. It is to be appreciated that although only first and second fluid plastisols, and the subsequent distribution of same, have been herein referenced, such references are not intended to exclude the use of more than two fluid plastisols or the use of additional distribution steps. Furthermore, the steps of applying and distributing such additional fluid plastisols may be varied, alternated and/or multiplied, so as to provide an innumerable array of design alternatives.

C. Forming the Final Product

The fluid plastisol mixture of the present invention may be set by various methods known in the art, and preferably by heat fusion, to form the final decorative surface covering product. As is appreciated by those skilled in the art, fluid plastisols are converted from their fluid state to their solid state by heating the fluid composition under time and temperature conditions effective to gel and then fuse the plastisol and form a strong, wear resistant solid material.

Although it is contemplated that several forming techniques are available and known to those skilled in the art for converting the fluid plastisol mixtures of the present invention to a solid, fused plastisol mixture, the forming step of the present invention preferably comprises introducing the fluid plastisol mixture into a heated chamber. It is typical that the coated substrate is introduced continuously into the heated chamber, such as a furnace or oven, and has a predetermined residence time therein. Furthermore, such furnace or oven typically includes one or more zones or sections thereof which are maintained at different temperature levels, with the temperature levels typically increasing gradually from the inlet section of the oven and peaking at or near the outlet section of the oven. It is expected that those skilled in the art will be capable of determining the appropriate conditions for carrying out the heating/forming step hereof, including adjustment of the temperatures and line speeds of such typically used ovens, without undue experimentation. It is generally preferred that during fusion, the fluid wear layer composition is raised to temperatures of from about 350° F. to about 450° F. for about 2 to about 6 minutes. It will be appreciated by those skilled in the art that the appropriate time and temperature conditions used to carry out the heating/forming step of the present invention will vary, depending upon numerous factors, such as the polymeric material and plasticizer being used, as well as the equipment being used. Furthermore, the forming step of the present invention is understood and intended to encompass the optional subsequent application of the hereinbefore discussed top coat to the fused, patterned solid plastisol mixture.

It is to be appreciated that the decorative surface coverings of this invention are not limited to the embodiments described above and that alternative modifications will be apparent from the above description to those skilled in the art. These and other alternatives are considered within the spirit and scope of the present application, and coverage thereof is intended by this application.

We claim:

1. A method of making a decorative surface covering comprising the steps of:
   (a) applying to a substrate a coating of a fluid plastisol composition comprising a first color;
   (b) distributing onto said applied first colored fluid plastisol a fluid plastisol composition comprising a second color to form a layer comprising a patterned fluid plastisol mixture wherein said second colored fluid plastisol penetrates into the thickness of said first colored plastisol coating; and
   (c) forming said patterned fluid plastisol mixture into a patterned solid plastisol mixture.

2. The method of claim 1 wherein said first color comprises a first substantially homogeneous color, and said second color comprises a second substantially homogeneous color.

3. The method of claim 1 wherein said first colored fluid plastisol is applied as a substantially uniform coating on said substrate.

4. The method of claim 3 wherein said first colored fluid plastisol is applied with a reverse roll coater.

5. The method of claim 1 wherein said distributing step comprises substantially randomly applying onto said first colored fluid plastisol a plurality of droplets comprising said second colored fluid plastisol to form a multicolored layer.

6. The method of claim 5 wherein said distributing step further comprises substantially randomly distributing said droplets within said first colored fluid plastisol.

7. The method of claim 6 wherein said droplets are randomly distributed by directing a plurality of randomly moving air streams onto said multicolored layer.

8. The method of claim 1 wherein said forming step comprises fusing said patterned fluid plastisol mixture.

9. The method of claim 1 wherein at least one of said plastisols comprises a foaming agent modifier.

10. The method of claim 1 wherein said first and second fluid plastisol compositions have a viscosity of at least 300 cps.

11. The method of claim 10 wherein said first and second fluid plastisol compositions have a viscosity of about 800 to about 1700 cps.

12. The method of claim 11 wherein the viscosity of said first fluid plastisol composition is different from the viscosity of said second fluid plastisol composition.

13. The method of claim 8 wherein said distributing of said droplets comprises mixing said second colored fluid plastisol with said first colored fluid plastisol.

14. The method of claim 13 wherein said mixing comprises reshaping said droplets by stretching said droplets in multiple directions.

15. The method of claim 14 wherein said mixing comprises partially blending said fluid plastisol compositions, resulting in a plastisol mixture having gradients of color therein.

16. A method of making a decorative floor covering comprising the steps of:
   (a) providing a substrate;
   (b) substantially uniformly coating said substrate with a first fluid plastisol composition comprising a first substantially homogeneous color;
   (c) substantially randomly applying onto said first plastisol a plurality of droplets comprising a second fluid plastisol comprising a second substantially homogeneous color to form a multicolored layer; and
   (d) substantially randomly distributing said droplets of said second plastisol in said first plastisol by directing a plurality of randomly moving fluid streams onto said multicolored layer, the number and movement of said fluid streams being effective to distribute said droplets to form a layer comprising a patterned fluid plastisol mixture having gradients of fluid color therein;
   (e) forming said patterned fluid plastisol mixture into a patterned solid plastisol mixture.

17. The method of claim 16 wherein said fluid plastisol compositions have a viscosity of about 800 to about 1700 cps.

* * * * *